United States Patent [19]
Anger

[11] Patent Number: 6,074,058
[45] Date of Patent: Jun. 13, 2000

[54] CENTRAL PIECE OF A FULL-RIM FRAME FOR EYEGLASSES

[75] Inventor: Wilhelm Anger, Salzburg, Austria

[73] Assignee: Hemaris GmbH, Chur, Switzerland

[21] Appl. No.: 09/233,572

[22] Filed: Jan. 19, 1999

[51] Int. Cl.$^7$ ..................................................... G02C 1/00
[52] U.S. Cl. ............................... 351/83; 351/41; 351/86; 351/154
[58] Field of Search ................................. 351/41, 83, 86, 351/89, 154

[56] References Cited

U.S. PATENT DOCUMENTS

| | | | |
|---|---|---|---|
| 4,405,214 | 9/1983 | Bolle | 351/88 |
| 4,762,407 | 8/1988 | Anger et al. | 351/204 |
| 5,526,069 | 6/1996 | Tseng | 351/83 |
| 5,602,603 | 2/1997 | Bondet | 351/41 |

FOREIGN PATENT DOCUMENTS

| | | |
|---|---|---|
| 77 11547 | 4/1977 | France . |
| 85 08326 | 6/1985 | France . |
| 30 38 032 A1 | 4/1981 | Germany . |
| 197 21 306 A1 | 11/1998 | Germany . |
| PCT/US86/00310 | 2/1986 | WIPO . |

OTHER PUBLICATIONS

Optik, Augenoptik und Augenschutz, Beuth Verlag GMBH, Taschenbuch 177, 1984, pp. 15–21.
Brillentechnik, Ulrich Maxam, Veb Verlag Technik Berlin, Linsen Fassungen Anpassung Instandsetzung, 1983, p. 30.

*Primary Examiner*—Huy Mai
*Attorney, Agent, or Firm*—Graybeal Jackson Haley LLP

[57] ABSTRACT

The central piece of a full-rim eyeglass frame includes a left full rim (2) for receiving a left lens, a right full rim (4) for receiving a right lens, a bridge (6) joining the two full rims, and two endpieces (8, 10). The two full rims, the bridge and the two endpieces are integrally formed as a single piece, from a plastic. The two full rims (2, 4) are flexible, and are constituted by a closed, elastic band. The central piece of the full-rim frame is assembled into a central piece of a pair of eyeglasses with two lenses, whose outer circumferential lines have somewhat larger dimensions than the inner contour lines of the two full rims, so that the full rims of the central piece of the eyeglasses are stretched around the lenses, and their shape conforms to the shape of the lenses.

27 Claims, 5 Drawing Sheets

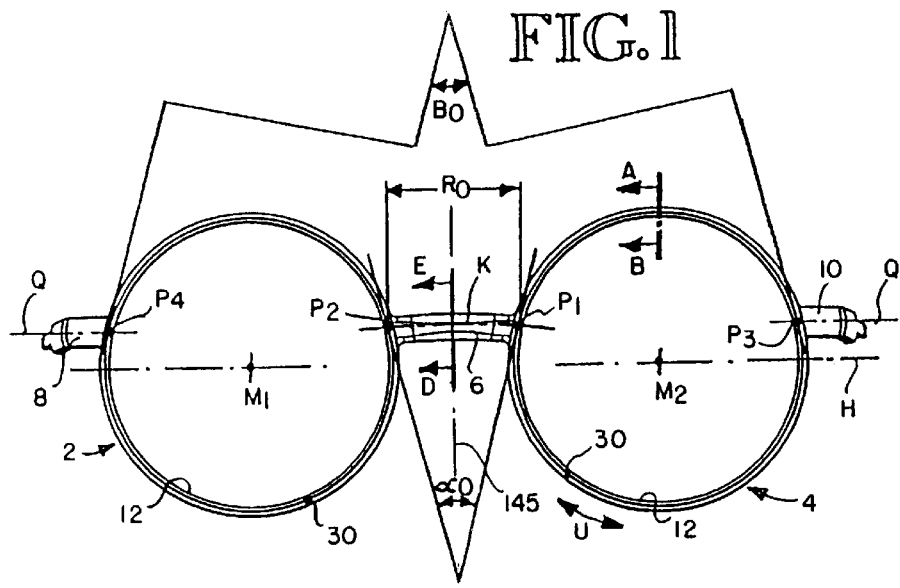
FIG. 1
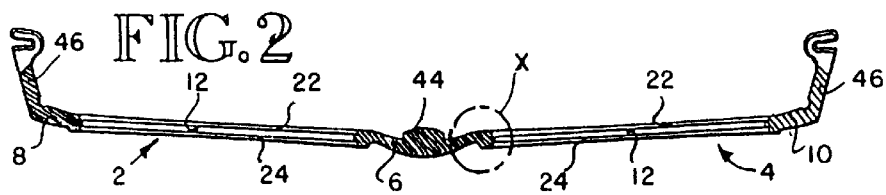
FIG. 2
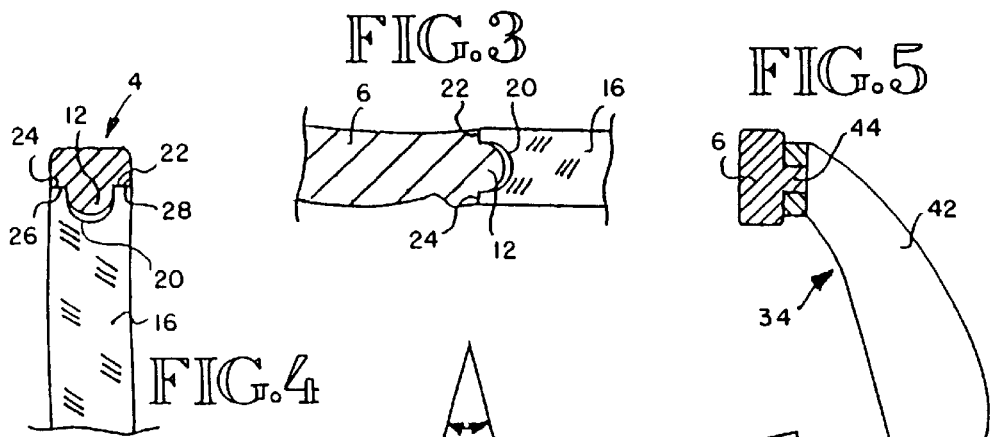
FIG. 3    FIG. 5
FIG. 4
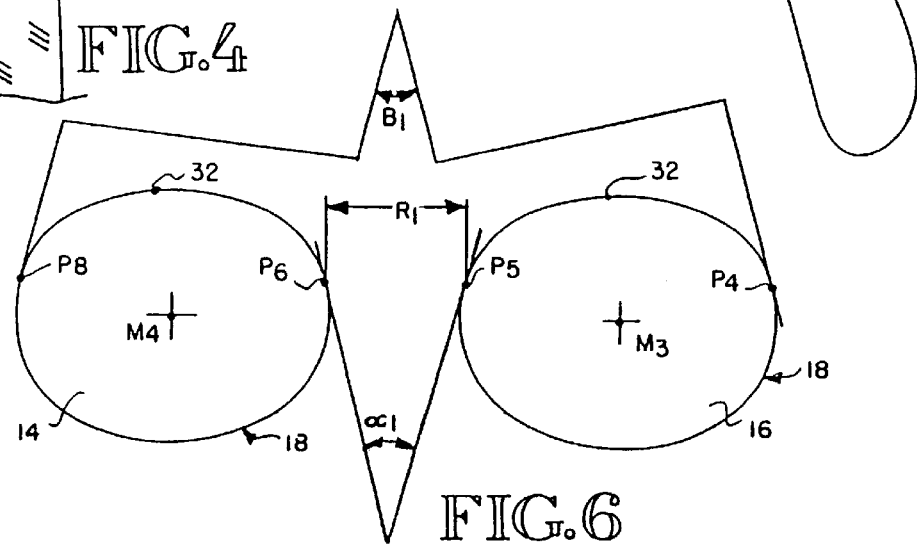
FIG. 6

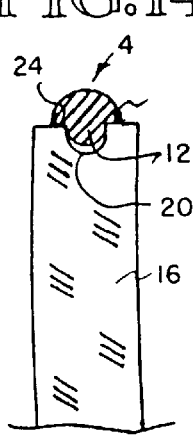
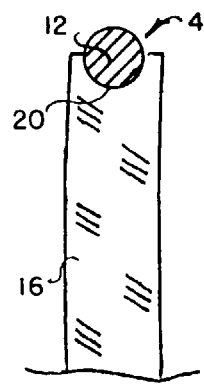
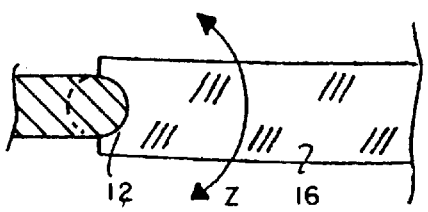
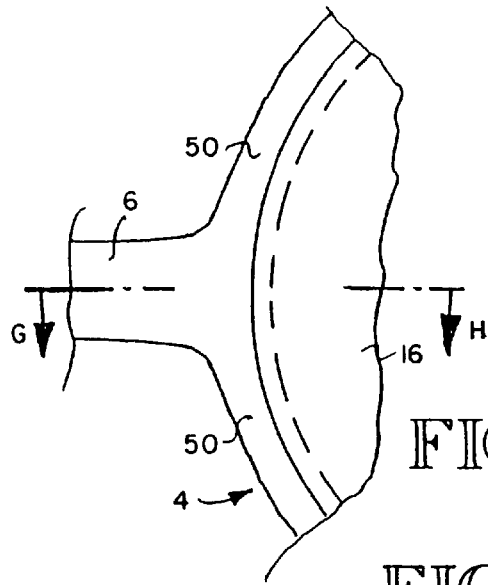
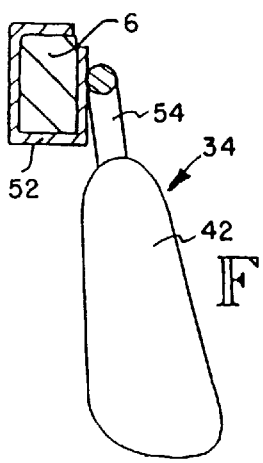
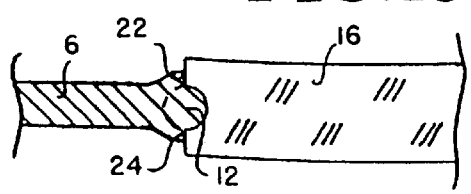

CENTRAL PIECE OF A FULL-RIM FRAME FOR EYEGLASSES

The invention relates to a central piece of a full-rim frame for eyeglasses according to the definition of species in claim 1.

Such a central piece is known. It is customarily assembled together with two temples to form an eyeglass frame, the temples being articulated to the central piece with the assistance of hinges arranged on the endpieces. If not only the central piece but also the earpieces are made of plastic, the result is a plastic frame. Once the two lenses have been inserted into the central piece, each of the two frame rims of the central piece completely surrounds the corresponding lens around its entire circumference. Such a frame rim completely surrounding the lens around its entire circumference is customarily, and here as well, called a "full rim." Accordingly, an eyeglass frame whose central piece has full rims is known as a full-rim frame. One of the advantages of a full-rim frame is that the lenses are protected around their edges against damage from impact or the like.

The known central piece is customarily produced by pressing a plastic material in an appropriate molding tool. One plastic frequently used for this purpose is an epoxy resin sold under the name "Optyl." The shape of the known central piece is predefined by the molding tool. Owing to the characteristics of the plastics customarily used for the known central piece, in combination with the dimensions of the central piece, this piece is a relatively rigid body whose form is essentially unchangeable. The course of the inner contour lines of the two full rims determines the so-called lens shape, i.e., the lineaments or shape of the outer circumferential lines of the lens to be set into the full rims. The shape of the left lens and the shape of the right lens are as a rule not congruent. However, in conventional eyeglasses with a full-rim frame, they are always symmetric to one another with reference to a vertical line through the middle. Hence in ophthalmic optics it is customary not to distinguish the shape of the left lens from the shape of the right lens, but rather to consider these a single lens shape. In the course of producing a pair of eyeglasses, the lens shape defined by the full rims of the central piece of the eyeglass frame is imaged on two lens blanks in such a way that the lens shape matches the course of the inner contour line of the corresponding full rim, so that the full rims can accept and retain the lenses. Since the lens shape is predetermined by a known central piece of the type under consideration here, it is necessary to produce appropriately varying central pieces to fit various lens shapes.

Also known are rimless frames for eyeglasses, which have no frame rims. In such frames, the lenses are an integral structural component of the central piece of the frame. The endpieces and bridge of a pair of eyeglasses with a rimless frame are joined to the lenses by screws, adhesive or the like. The lens shape is not predefined in a rimless frame. Rather, lenses of different shapes may be assembled together to make different eyeglasses, using the same bridges and endpieces. But in a pair of eyeglasses with a rimless frame, the edges of the lenses are not protected. Furthermore, at the points where they are joined to the bridge and endpieces, the lenses are subjected to locally elevated mechanical stress, which results in an increased risk of breakage.

Furthermore known are half-rim frames which only partially surround the lenses. The central piece of such a half-rim frame has two partial rims, extending from the bridge to either endpiece, which receive the lens around part of its circumference. Around the other portion of the circumference of the lens runs a plastic filament which is anchored to the two ends of the corresponding partial rim with the assistance of anchoring mechanisms. Such a half-rim frame defines the lens shape, at least along the section of the lens edge engaged by the partial rim.

The invention has the object of further configuring the central piece according to the definition of species, in such a way that it is not exclusively suited to a specific shape of lens alone. The advantages of a central piece with two full rims, particularly its protective function for the lenses and comparatively low mechanical stress on them, are to be largely maintained. Yet at the same time, there should be no need to produce, for each desired lens shape, a central piece suited exclusively for that shape.

According to the present invention, this object is accomplished by the central piece as recited in claim 1. This central piece is first of all characterized by the fact that the two full rims are flexible, and are constituted by a closed, elastic band.

The flexibility or pliability of the full rims makes it possible to modify their shape within wide limits, without destroying the central piece. This means that the inner contour lines of the full rims may be adapted to different lens shapes, so that any of numerous different lens shapes may be chosen, provided that the length of the circumference of these lens shapes is the same. Hence the central piece now predetermines not the lens shape, i.e., the shape of the circumferential line, but rather the length of the circumferential line. In the course of producing a pair of eyeglasses using the central piece according to the present invention, the two lenses with the chosen lens shape are inserted into the full rims, whereupon the lenses impress their shape upon the rims. The central piece according to the present invention thus makes it possible to use the same central piece to produce eyeglasses with different lens shapes. Hence with the central piece according to the present invention there is no need to produce, for each desired lens shape, a central piece exclusively suited for that lens shape.

Since the full rims in the central piece according to the present invention are flexible—in other words, they have low inherent rigidity and oppose only a low resistance to the action of forces from outside—provision is made for the full rims to be stretched around the lenses, and thus they fit against the edges of the lenses under the action of a prestress, and are held in their intended position by these edges. For this purpose, the central piece according to the present invention is combined with lenses the length of whose circumferential line is somewhat greater than the length of the inner contour line of the full rims, for example by 3%. Thus on inserting the lens into the associated full rim, the full rim is elongated in the direction of its circumference. According to the present invention, the band constituting each full rim is elastic, so that this elongation can take place within the elastic range and the corresponding elastic stresses are lastingly maintained.

Furthermore, the band constituting each full rim is configured in a closed shape, according to the present invention. This means that the band, and thus the full rim, represents an uninterrupted ring without joints or the like, so that the tensile forces in the circumferential direction, generated due to the prestress, are compensated within the band or full rim, and do not need to be absorbed by elements other than the full rim itself. The cohesion of the full rim is thus fully ensured by the closed configuration of the band. Neither the bridge nor the endpiece arranged on the full rim needs to provide for the cohesion of the full rim. The bridge and endpieces are thus relieved of the tensile stresses prevailing within the full rim due to its prestressing. The closed configuration of the band makes it superfluous to provide means for closing the full rim, such as for example are applied in metal full-rim frames, in the form of so-called "closing assemblies." Moreover, because of the closed configuration of the band, the central piece according to the present invention obviates the need for anchoring mechanisms, such as are necessary in half-rim frames in order to anchor the plastic filaments provided in these frames.

As can be seen from the above explanation of the present invention, one of the advantages achieved by the invention is that the central piece no longer predetermines the shape of the eyeglass lenses, so that using the same central piece one can produce eyeglasses with different lens shapes. This is achieved by the present invention without eliminating full rims, so that the invention also affords the advantages of the latter, particularly their function of protecting the lenses and the comparatively low mechanical stress on the lenses.

Since the two full rims are flexible and are constituted by a closed, elastic band that is stretched around the corresponding lens in the finished pair of eyeglasses, in the central piece according to the present invention the full rims may have a smaller cross-section area than conventional plastic full-rim frames, and a correspondingly lesser bulk. Thus the invention makes it possible to produce the central piece with a very low weight, so that the eyeglasses produced using the central piece according to the present invention are lightweight, and their wearing comfort is correspondingly high.

Although the central piece is made of plastic, the configuration according to the present invention makes it possible to configure the full rims with a thinness similar to that of metal full-rim frames, so that a pair of eyeglasses with the central piece according to the present invention has the advantage that the restriction of the field of view is low, similarly to that of a metal full-rim frame, yet one does not have to allow for the disadvantage of a metal full-rim frame, namely the substantial outlay involved in the production process.

Advantageous implementations of the invention are defined in the dependent claims and may be seen from the following description of exemplary embodiments, making reference to the drawings.

FIG. 1 shows a front view of a first exemplary embodiment of the central piece according to the present invention;

FIG. 2 shows a cross-sectional representation of FIG. 1;

FIG. 3 shows detail X from FIG. 2 in an enlarged representation, additionally showing a section of the lens inserted into the central piece;

FIG. 4 shows an enlarged, sectional cross-section along A–B in FIG. 1, additionally showing a section of a lens inserted into the central piece;

FIG. 5 shows an enlarged cross-section along C–D in FIG. 1, additionally showing a pad arm component;

FIG. 6 shows a front view of two lenses that can be inserted into the central piece from FIG. 1;

Figure 9:
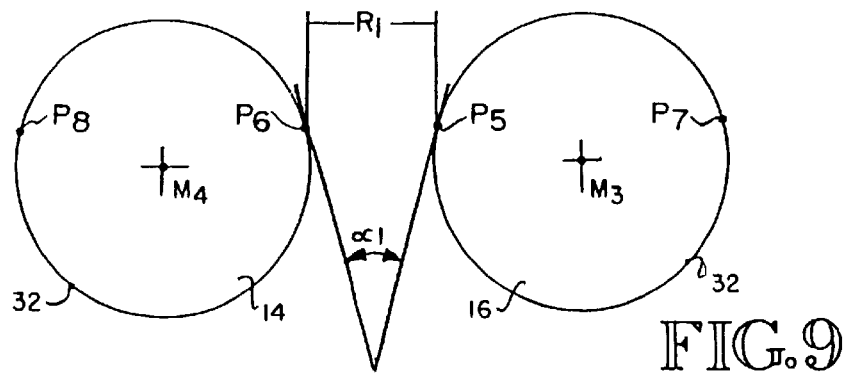
Figure 10:
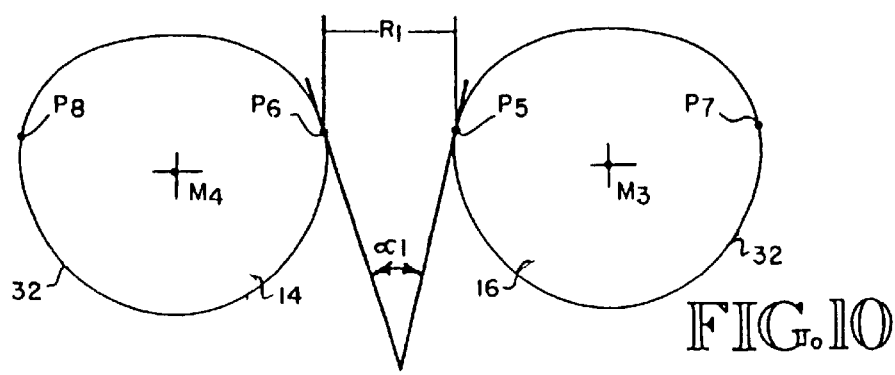
Figure 11:
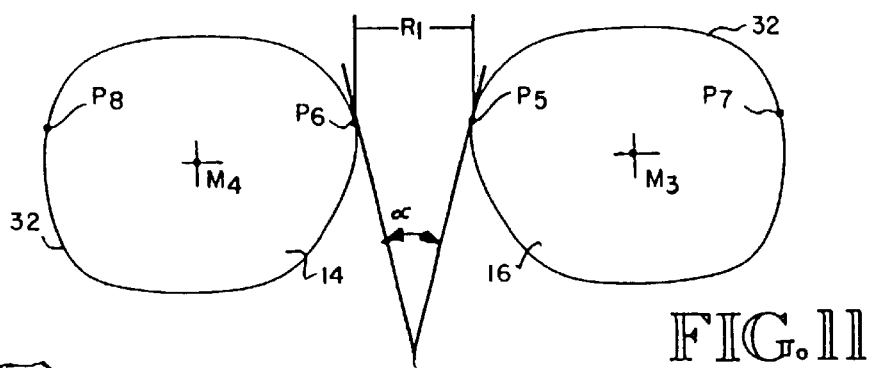
Figure 12:
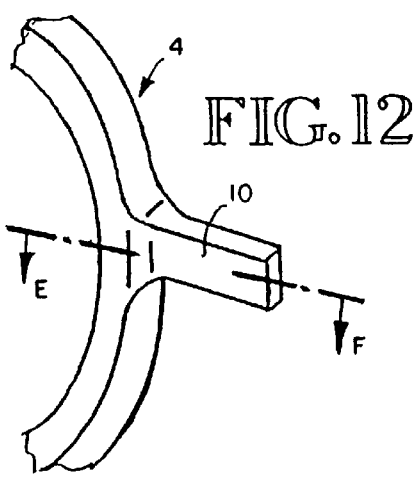
Figure 13:
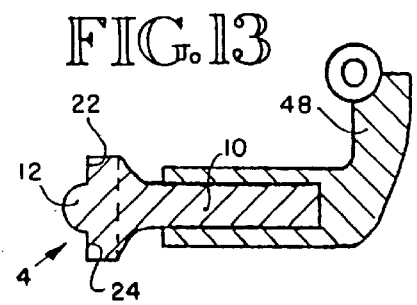
Figure 18:
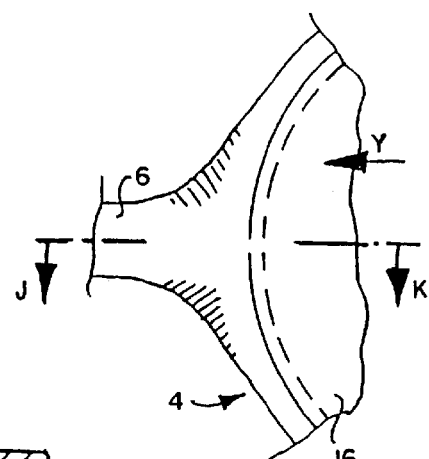
Figure 20:
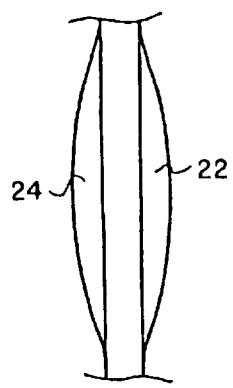
Figure 22:
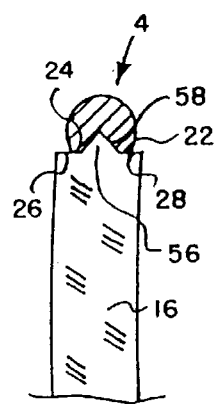
Figure 23:
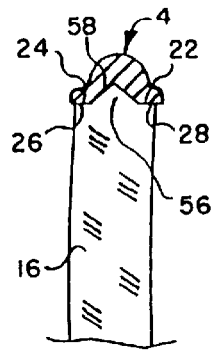
Figure 24:
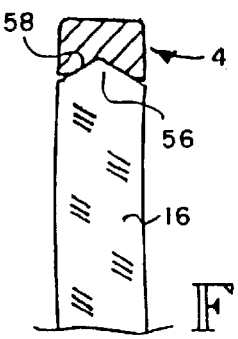

FIGS. 9 through 11, in a view similar to FIG. 6, show lenses that may be used in the central piece from FIGS. 1 and 2, and that differ in lens shape from one another and from the lenses shown in FIG. 6;

FIG. 12 shows a sectional perspective view of a second exemplary embodiment of the central piece according to the present invention;

FIG. 13 shows a cross-section along E–F in FIG. 12, additionally showing a hinge leaf;

FIG. 14, in a view similar to FIG. 4, shows a full rim as used in a third exemplary embodiment of the central piece according to the present invention;

FIG. 15, in a view similar to FIG. 4, shows a full rim as used in a fourth exemplary embodiment of the central piece according to the present invention;

FIG. 16 shows a sectional front view of the central piece with the full rim from FIG. 15, additionally showing a sectional view of the lens inserted into the central piece;

FIG. 17 shows a cross-section along G–H in FIG. 16;

FIG. 18, in a view similar to FIG. 16, shows a modification of the exemplary embodiment from FIGS. 15 through 17;

FIG. 19 shows a cross-section along J–H in FIG. 18;

FIG. 20 shows a view along Y in FIG. 18, not showing the lens;

FIG. 21 shows a view similar to FIG. 5 with a different pad arm component than FIG. 5;

FIG. 22, in a view similar to FIG. 4, shows a full rim as used in a fifth exemplary embodiment of the central piece according to the present invention;

FIG. 23, in a view similar to FIG. 4, shows a full rim as used in a sixth exemplary embodiment of the central piece according to the present invention; and FIG. 24, in a view similar to FIG. 4, shows a full rim as used in a seventh exemplary embodiment of the central piece according to the present invention.

FIGS. 1 through 5 are intended to explain a first exemplary embodiment of a central piece of a full-rim frame for eyeglasses, according to the present invention. FIGS. 1 and 2 show the central piece alone. FIG. 2 is a horizontal section along a line defined by the midlines K and Q, explained further below, from FIG. 1. FIGS. 3 through 5 show the central piece along with other elements which are assembled together with it in producing a pair of eyeglasses using the shown central piece.

The central piece shown in FIGS. 1 and 2 is produced as a single piece from a plastic, preferably by the injection-molding method using a thermoplastic plastic. A suitable plastic is selected on the one hand in consideration of the usual aspects for eyeglass-frame plastics, including the requirement for tolerability on the skin, sweat resistance, adequate inherent stability at the expected use temperatures, and adequate impact strength, notch impact strength and scratch resistance. On the other hand the plastic is selected taking into account the aspect that the plastic must ensure adequate flexibility and long-term elasticity of the full rims of the central piece. One suitable plastic, for example, has proved to be a polyamide marketed by the Hüls AG company, of Marl, Germany, under the name "Trogamid." Also suitable, for example, are polyether sulfones, polysulfones and their copolymers, such as the plastic marketed by the BASF company, of Ludwigshafen, Germany, under the name "Ultrason."

FIGS. 1 and 2 show the central piece in the unstressed and undeformed state, as it exists in ready-to-use condition after injection molding (and after any necessary or desired finishing by deburring, smoothing, etc.).

The central piece is symmetric with respect to a plane of symmetry that coincides with the section plane C–D in FIG. 1, and in which lies the vertical midline MS of the central piece. The central piece includes a left full rim 2, a right full rim 4, a bridge 6 arranged between the two full rims 2 and 4 and joining them together, and a left endpiece 8 and a right endpiece 10. The expressions "left," "right," "above/upper"

and "below/lower," as well as similar expressions, refer to FIG. 1 unless indicated otherwise. The endpieces 8 and 10 are each arranged on the side of the full rim 2 or 4 opposite the bridge 6. Since the central piece as a whole has been injection-molded, the two full rims 2 and 4, the bridge 6 and the two endpieces 8 and 10 are integrally configured as a single piece.

Each of the two full rims 2 and 4 is constituted by a closed band, and thus represents a closed ring which assumes a circular shape in the illustrated exemplary embodiment. The plastic of which the central piece is composed, and the dimensions of the band constituting the full rims, are selected in such a way that the band can be elastically elongated in the direction of its longitudinal axis, and thus in the circumferential direction U of each full rim, and that the full rims 2 and 4 are so flexible or pliable that the shape of the full rims may be altered without destroying or damaging the central piece. This flexibility affords a modifiability of the structure or shape of the full rims to such an extent that the radii of curvature of the full rim in its unstressed and undeformed shape may at the least be both halved and doubled. The full rims possess this flexibility or pliability around their entire circumference, except for those sections at which the full rims are stiffened by the molded-on bridge 6 and the molded-on endpieces 8 and 10.

In cross-section, i.e., in a vertical sectional plane perpendicular to the longitudinal axis of the band forming the full rim 2 or 4, each of the two full rims 2 and 4 has the profile shown in FIG. 4. This profile is essentially flat and rectangular. On the inside of each of the two full rims 2 and 4 is configured a surrounding protrusion 12 extending radially inward, which in the shown exemplary embodiment has an essentially semicircular profile, as shown in FIGS. 3 and 4. When a left lens 14 or right lens 16 (see FIG. 6) is inserted into the full rim 2 or 4, respectively, as shown in FIGS. 3 and 4, the protrusion 12 engages with a surrounding groove 20 configured in the edge 18 of the corresponding lens, said groove preferably being dimensioned in the shown manner in such a way that the protrusion 12 does not fit flush against its bottom. On both sides of the protrusion 12, each of the two full rims 2 and 4 has on its inner side surrounding support surfaces 22 and 24, which fit against flat sections 26 and 28 on the edge 18 of the lenses 16 and 14, as shown in FIGS. 3 and 4. The two flat sections 26 and 28 are configured on either side of the groove 20.

In the shown exemplary embodiment, the projection of the two support surfaces 22 and 24 into the plane of the drawing in FIG. 1 yields the inner contour line 30 of the respective full rim, and the projection of the two flat edge sections 26 and 28 in a plane perpendicular to the optical axes of the lenses 14 and 16 (the plane of the drawing in FIG. 6) yields the outer circumferential line 32 of the respective lens. In the shown exemplary embodiment of the central piece, the inner contour lines 30 are circles. As was already set forth in the introduction, the course or shape of the outer circumferential line 32 is customarily—and here as well—called the lens shape. Regardless of whether they are made of plastic or mineral glass, the lenses are rigid bodies, and thus the shape of the lenses is unchangeable after they have been ground from the raw blanks. On the other hand, the inner contour lines 30 of the central piece described here may be changed in the finished central piece. Because of the flexibility of the full rims 2 and 4, the shape of the inner contour lines 30 may be changed, and because of the elasticity of the band constituting the full rims, the length of the inner contour lines 30 may be changed.

The bridge 6 of the central piece shown in FIGS. 1 and 2 is configured as a slightly bent crosspiece whose midline K is sketched in FIG. 1. This midline L [sic!] intersects the inner contour lines 30 at points which we will here call bridge connection points $P_1$ and $P_2$, spaced a distance R apart. The geometric midpoints $M_1$ and $M_2$ of the two full rims 2 and 4 are shown in FIG. 1. A straight line joining the two geometric midpoints $M_1$ and $M_2$ forms the midline N of the central piece. In the shown exemplary embodiment, the two bridge connection points $P_1$ and $P_2$ lie above the midline N. Tangents to the two inner contour lines 30 at the bridge connection points $P_1$ and $P_2$ enclose an angle which is here called the bridge angle $\alpha_0$. In the shown exemplary embodiment, the bridge angle $\alpha_0$ has a value of 30° and the spacing $R_0$ has a value of 18 mm.

The two endpieces 8 and 10 of the central piece are each configured as a short bracket-like structure, extending parallel to the midline N. In FIG. 1, the midline Q is drawn in for each of the endpieces 8 and 10. These midlines Q intersect the inner contour lines 30 at points which we will here call endpiece connection points $P_3$ and $P_4$. In the shown exemplary embodiment, the endpiece connection points $P_3$ and $P_4$, like the bridge connection points $P_1$ and $P_2$, lie above the midline N and have the same spacing from this line as the bridge connection points $P_1$ and $P_2$. Tangents applied to the inner contour lines 30 at the endpiece connection points $P_3$ and $P_4$ enclose an angle $\beta_0$, here called the endpiece angle. Because of the circular shape of the two inner contour lines 30 and because the spacing from the midline N is the same for both the bridge connection points $P_1$ and $P_2$ and the endpiece connection points $P_3$ and $P_4$, in the shown exemplary embodiment the endpiece angle $\beta_0$ is equal to the bridge angle $\alpha_0$ and is thus likewise 30°.

In the central piece described above, the two bridge connection points $P_1$ and $P_2$ and the two endpiece connection points $P_3$ and $P_4$ are arranged the same distance above the midline N. But this is not an essential feature of the central piece according to the present invention. Rather, the distance of the bridge connection points $P_1$ and $P_2$ from the midline N may differ from the distance of the endpiece connection points $P_3$ and $P_4$ from the midline. Furthermore, it is not necessary for the indicated points to be arranged above the midline N.

The bridge connection point and the endpiece connection point on each of the full rims subdivide its inner contour line 30 into an upper contour line segment, and a lower contour line segment which—in the case of the right full rim 4—extends along the lower section of the full rim 4 from the bridge connection point $P_1$ to the endpiece connection point $P_3$. If $L_0$ is defined as the total length of the inner contour line 30 in an unstressed, unstretched central piece, and if $L_{0u}$ is defined as the length of the lower contour line segment between points $P_1$ and $P_2$ under the same conditions, the ratio between these two lengths is thus $\lambda = L_{0u}/L_0$.

The two full rims 2 and 4 of the central piece are intended to receive two lenses, and to hold them in a desired position relative to one another. The two lenses 16 and 14 shown in FIG. 6 are an example of lenses that may be held by means of the central piece from FIGS. 1 and 2 in the relative arrangement shown in FIG. 6. If the lenses 14 and 16 are inserted into the full rims 2 and 4, the supporting surfaces 22 and 24 of the full rims come into contact with the corresponding lens's flat sections 26 and 28 around the entire circumference of the lens, so that the inner contour line 30 of the full rim is congruent with the outer circumferential line 32 of the respective lens. Provision is made for the full rims to be stretched around the lenses. Hence the outer circumferential line 32 of the lenses has a total length $L_1$ defined by $$L_1 = L_0(1+\epsilon)$$

where $\epsilon$ is the desired elongation of the band constituting the respective full rim, and is defined by $\epsilon = \Delta L_0/L_0$, where $\Delta L_0$ is the change in length induced in the band constituting the full rim due to the insertion of the lens. The elongation $\epsilon$ is suitably chosen, taking account of the material characteristics of the plastic of which the central piece is made, as well as the dimensions of the full rims, and the elongation is expediently not greater than necessary for the reliable retention of the lenses. Values of between 1% and 5% have proved suitable for the elongation $\epsilon$.

Lenses of any desired shape may be inserted into the central piece described above, provided their outer circumferential line is exclusively convex, has a length $L_1 = L_0(1+\epsilon)$ with $\epsilon > 0$, and has no curvatures larger or smaller than the flexibility of the full rims will permit without significant damage.

When the lenses are inserted into the full rims, the band constituting the latter is elongated. Moreover, the shape of the inner contour lines 30 of the full rims 2 and 4 is changed during the process, if the shape of the lenses differs from the shape of the inner contour lines of the unstressed, undeformed central piece without lenses. However, the insertion of the lenses into the central piece does not alter the shape and dimensions of its bridge 6, so that in the central piece with the lenses inserted, both the bridge angle and the spacing between the bridge connection points $P_1$ and $P_2$ are the same as in the undeformed central piece. Likewise the length ratio $\lambda$ is not changed by the insertion of the lenses. Consequently in the central piece of the eyeglasses—composed of the central piece of the full-rim frame and the inserted lenses—the bridge connection points $P_1$ and $P_2$ of the central piece coincide with two points lying opposite one another on the outer circumferential lines 32, spaced apart by the distance $R_0$ defined by the central piece, and having tangents enclosing the bridge angle $\alpha_0$ defined by the central piece. This situation is explained using an example, with reference to FIG. 6.

As can be seen in FIG. 6, the two lenses 14 and 16 shown there have an elliptical lens shape and thus an outer circumferential line 32 whose shape differs from the circular shape of the outer circumferential line 30 of the undeformed central piece as shown in FIGS. 1 and 2. The length $L_1$ of the outer circumferential lines 32 is selected according to the equation indicated above, $L_1 = L_0(1+\epsilon)$, with $\epsilon = 3.0\%$. On the two outer circumferential lines 32, one can find two mutually opposing points $P_5$ and $P_6$, which are symmetric with respect to the vertical axis of symmetry of the shown lens arrangement, and whose tangents enclose an angle $\alpha_1$ equal to the bridge angle $\alpha_0$ ($\alpha_1 = \alpha_0$). The two lenses 14 and 16 are arranged spaced apart from one another in such a way that the distance $R_1$ between the two points $P_5$ and $P_6$ is equal to $R_0$ ($R_1 = R_0$). If the two lenses 14 and 16 are inserted into the central piece as shown in FIGS. 1 and 2 in such a way that the point $P_5$ coincides with the bridge connection point $P_1$, and the point $P_6$ coincides with the bridge connection point $P_2$, the two lenses are held by the central piece precisely in the relative arrangement shown in FIG. 6. From the optical and anatomical standpoints this is a reasonable relative arrangement, in which the bridge 6 of the central piece is arranged between the points $P_5$ and $P_6$, and thus above the midline of the shown lens arrangement as defined by the geometric midpoints $M_3$ and $M_4$ of the lenses.

A point $P_7$ on the outer circumferential line 32 of the right lens 16 is defined such that the length of the lower segment of the circumferential line between the point $P_5$ and the point $P_7$ is equal to $(\lambda \cdot L_1)$, where the length ratio $\lambda$ is defined by the central piece. Corresponding considerations apply for a point $P_8$ on the circumferential line of lens 14. If the lenses 14 and 16 are inserted into the central piece, the endpiece connection points $P_3$ and $P_4$ of the central piece coincide with the points $P_7$ and $P_8$. In the lens arrangement as shown in FIG. 6, these points lie above the midline of the arrangement, so that the endpieces 10 assume a reasonable position, from the anatomical standpoint, on the central piece of the eyeglasses. Moreover, in the lens arrangement as shown in FIG. 6, the lens shape is selected in such a way that the tangents at the points $P_7$ and $P_8$ enclose an angle $\beta_1$ equal to the endpiece angle $\beta_0$ ($\beta_1 = \beta_0$), so that the midlines Q of the endpieces 8 and 10 also have an essentially horizontal course in the central piece of the eyeglasses, as shown in FIG. 1. It is not necessary, however, for the angle $\beta_1$ to be equal to the endpiece angle $\beta_0$, since the midlines Q of the endpieces 8 and 10 on the central piece of the eyeglasses may also be inclined upward or downward.

In the course of producing a pair of eyeglasses using the central piece as shown in FIGS. 1 and 2 and the lens arrangement as shown in FIG. 6, the two lenses 14 and 16 are inserted into the full rims 2 and 4 in such a way that the points $P_5$ and $P_6$ coincide with the bridge connection points $P_1$ and $P_2$. To do this, the protrusion 12 on the corresponding full rim is slipped over one of the two flat sections 26 and 28 of the edge 18 of the lens until the protrusion 12 engages with or snaps into the groove 20 of the lens, so that the state shown in FIGS. 3 and 4 results. During this assembly procedure, the band constituting the respective full rim is elongated, and the shape of the full rim conforms to the shape of the lenses 14 and 16. The central piece of the full-rim frame then holds the two lenses in the relative arrangement shown in FIG. 6.

Figure 7:
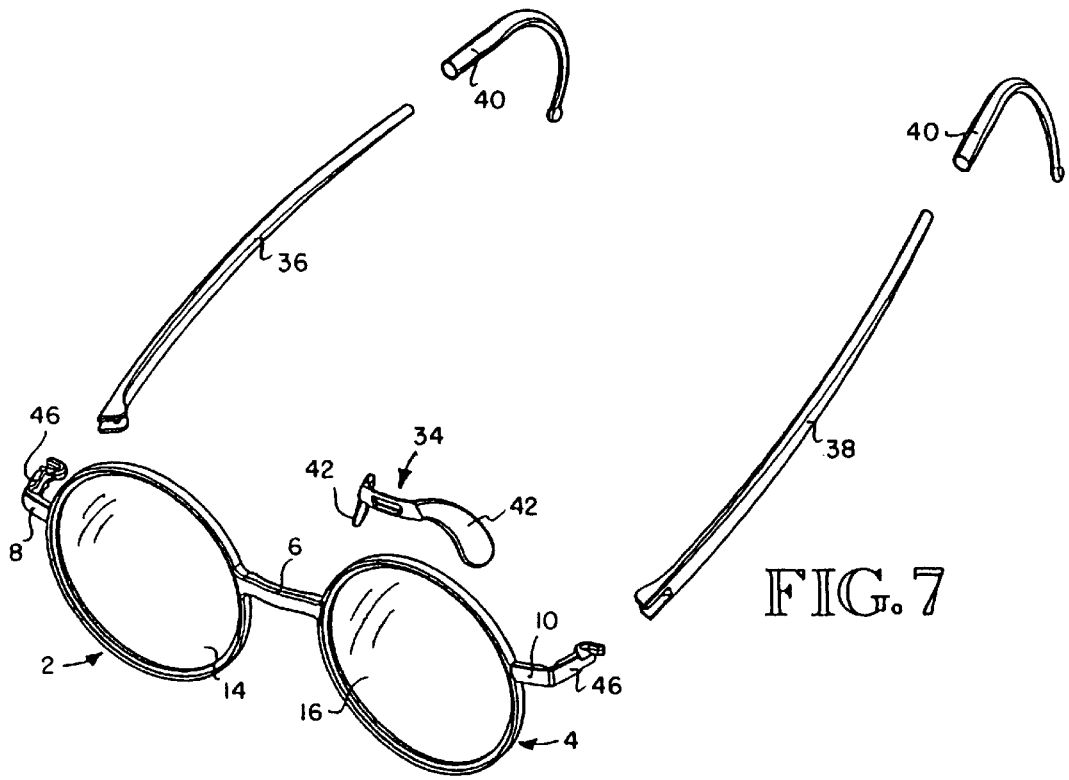
FIG. 7 shows a perspective view of components of a pair of eyeglasses produced using the central piece shown in FIGS. 1 and 2 and the lenses shown in FIG. 6.
Figure 8:
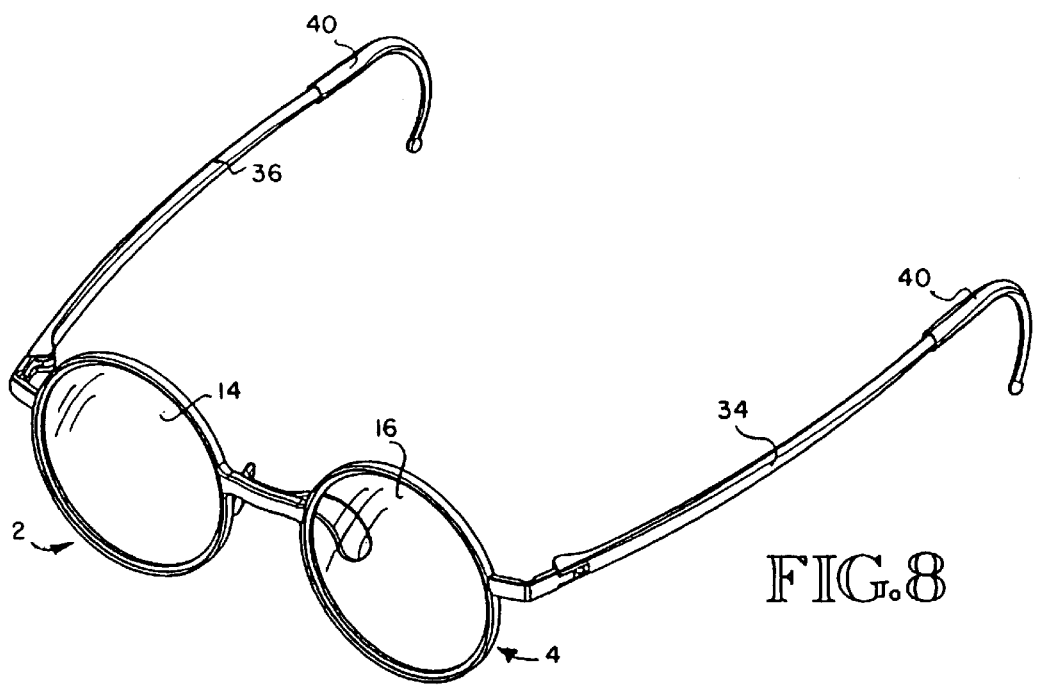
FIG. 8 shows a perspective view of a pair of eyeglasses assembled from the components shown in FIG. 7.

The central piece of a pair of eyeglasses assembled in this way—composed of the central piece of the full-rim frame and the inserted lenses—is shown in perspective in FIG. 7, together with other components of the eyeglasses. These latter are a pad arm component 34, a left temple shaft 36, a right temple shaft 38 and two earpieces 40. The pad arm component 34 is a part made of plastic and has two side pads 42 joined together by a connecting section. The connecting section of the pad arm component 34 locks together with a fitting strip 44 molded onto the bridge 6 (see FIG. 5). This connection may be fastened, for example by means of an adhesive. A hinge leaf 46 is directly molded onto each of the two endpieces 8 and 10 of the central piece. Each of the two hinge leaves 46 engages with a complementary hinge leaf on the front end of the corresponding temple shaft 36 or 38, such that a hinge results, as described in German Patent Application 197 21 306.5. The earpieces 40 are applied onto the back ends of the temple shafts 36 and 38. The finished pair of eyeglasses then appears as shown in FIG. 8. These eyeglasses have a full-rim frame in which the shape of the lenses is not defined by the shape of the full rims of the central piece of the full-rim frame, but rather the shape of the full rims accommodates itself to the shape of the lenses.

FIG. 6 shows only one example of a lens arrangement that may be held by the central piece as shown in FIGS. 1 and 2. Further examples of lens shapes and relative arrangements of lenses that may held by the described central piece are shown in FIGS. 9 through 11. FIG. 9 shows a lens arrangement in which the lens shape is circular. FIG. 10 shows a lens arrangement with a lens shape known as pantoscopic. FIG. 11 shows a lens arrangement with a lens shape known as anatomical. For the points $P_5$ and $P_6$, $P_7$ and $P_8$ diagrammed in FIGS. 9 through 11, the angle $\alpha_1$ and the spacing $R_1$, the explanation of the lens arrangement from FIG. 6 applies. The lens arrangements shown in FIGS. 9 through 11 have in common that the length of the outer circumferential line of the two lenses is $L_1=L_0(1+\epsilon)$ with $\epsilon>0$, $\alpha_1=\alpha_0$ and $R_1=R_0$. Hence the lens arrangements shown in FIG. 6 and in FIGS. 9 through 11 can be accepted by the same central piece as is explained in detail above with reference to FIGS. 1 through 4. The full rims of the central piece of the full-rim frame conform in each case to the shape of the lenses in the desired lens arrangements. Thus a single central piece is suitable to accept lens arrangements with differing lens shapes.

It goes without saying that not only lens arrangements with the lens shapes as shown in FIGS. 6 and 9 through 11 may be used in the same central piece. Rather, there are numerous additional lens shapes and lens arrangements, not shown, which may be held by the same central piece.

In the central piece described above with reference to FIGS. 1 and 2, the full rims in the unstressed and undeformed state are circular. This circular shape is maintained when the lenses as shown in FIG. 9 are inserted into the central piece; the circular shape is altered when the lenses as shown in FIGS. 6, FIG. 10 or FIG. 11 are inserted into the central piece. However, it is not a necessary feature of the present invention that the full rims of the unstressed, undeformed central piece must be circular in shape. Rather, the central piece may be produced with full rims in other shapes, whose shape for example may match that of the lens as shown in FIG. 10. In this case, the shape of the full rims would not change when the lenses with the shape as shown in FIG. 10 are employed. (However, the length of the inner contour line would change from $L_0$ to $L_1$.) The shape of the frame rims would change, however, if the lenses as shown in FIG. 6, FIG. 9 or FIG. 11 were used.

In the first exemplary embodiment of the central piece, the hinge leaves 46 are molded directly onto the endpieces 8 and 10. In a departure from this configuration, in a second exemplary embodiment of the central piece as shown in FIGS. 12 and 13, provision is made that each of the endpieces 10 and 8 is configured as a peg-like protrusion, and a separately produced hinge leaf 48 is fastened thereto, as is shown schematically in FIG. 13. In the case of the second exemplary embodiment, the production of the injection-molding tool for the central piece is simplified.

FIG. 14 shows, in a view similar to FIG. 4, the profile of the full rims in a third exemplary embodiment of the central piece. In this case the profile is defined by two semicircles with different radii, and two straight lines joining the semicircles, the semicircle with the smaller radius being arranged on the inner side of the full rim. The full-rim section whose profile is defined by the semicircle with the smaller radius constitutes the protrusion 12 on the full rim, which engages in the groove 20 on the lenses when the lenses are inserted. The straight lines of the profile fit against the support surfaces 22 and 28 of the full rim. The full rim with the profile as shown in FIG. 14 is rounded on its outer side to match the semicircle with the larger radius, and is advantageous in that it offers hardly any points of attack for forces acting upon the full rim from outside, such as might pry the rim away from its engagement with the groove 20.

FIGS. 15 through 17 illustrate a fourth exemplary embodiment in which the profile of the full rims is circular. In this case the full rim has no support surfaces corresponding to the support surfaces 22 and 24. The section of the full rim lying radially inward constitutes the rim protrusion 12, which in this case fits flush against the floor of the groove 20. The depth of the groove 20 is preferably somewhat greater than the radius of the circular profile.

In the fourth exemplary embodiment, the sections 50 of each full rim, adjacent to the bridge 6, constitute torsion springs that permit a certain pivoting motion of the lens with reference to the bridge 6, as is indicated for the right lens 16 by a double arrow Z in FIG. 17. Admittedly, this reduces the rigidity of the central piece of the eyeglasses. However, an advantage is that in the event of an impact, for example against one of the endpieces, the eyeglasses can yield in the direction of the aforementioned pivoting motion, thus averting both the risk of destroying the glasses and the risk of injury to the wearer.

If the rigidity of the central piece of the eyeglasses is to be greater than in the fourth exemplary embodiment, this embodiment may be modified in the manner shown in FIGS. 18 through 20. In the modification shown in these figures, the central piece is thickened in the transitional zone between the bridge 6 and the corresponding full rim, both in the radial direction and in the depth direction. This thickening is immediately evident in FIGS. 19 and 20, and is indicated by cross-hatching in FIG. 18. On the thickening are configured the two support surfaces 22 and 24, which fit against the edge of the corresponding lens, as in the first exemplary embodiment, but unlike the first exemplary embodiment, they do not extend around the entire circumference of the lenses. In a manner similar to what is shown in FIGS. 18 through 20 for the transitional zone between the bridge and the full rim, provision may also be made for a thickening in the transitional region between the endpiece and the corresponding rim, fitting against support surfaces on the edge of the lens similar to the support surfaces 22 and 24.

FIG. 21 shows an alternative to the configuration as shown in FIG. 5. In the configuration shown in FIG. 21, the fitting strip 44 is not molded onto the bridge 6. The pad arm component 34 in this case comprises a slotted metal sleeve 52 bent around the bridge 6, having soldered to its back a U-shaped wire loop 54 which has at its lower, free ends two side pads, of which only the side pad 42 is visible in FIG. 21. The pad arm component 34 shown in FIG. 21 reinforces the central piece of the eyeglasses in the region of the bridge 6.

In the exemplary embodiments described above, each of the two full rims has on its inner side the surrounding protrusion 12, intended to engage with the groove 20 configured on the edge 18 of the corresponding lens. As an alternative to this, provision may be made in the frame according to the present invention for each of the two full rims 2 and 4 to have a surrounding groove on its inner side, intended to engage with a surrounding protrusion configured on the edge of the corresponding lens. Examples of this are shown in FIGS. 22 through 24.

In the exemplary embodiment shown in FIG. 22, on the edge of the lens 16 and surrounding its entire circumference is configured a protrusion 56 with a triangular profile, adjoined on both sides by the flat sections 26 and 28 of the rim. Such a protrusion 56 is known in ophthalmic optics as a central "special"[1] bevel. In the lens with the protrusion 56, the outer circumferential line 32 and thus the shape of the lens is defined by the course of the radially outward edge of the protrusion 56. In the exemplary embodiment shown in FIG. 22, the full rim 4 (as well as the left full rim 2, not shown) has the shown, essentially circular profile. On the inner side of the full rim 4, a surrounding groove 58 is configured, which engages with the surrounding protrusion 56. On both sides of the groove 58, the support surfaces 22 and 24 are configured on the full rim 4, adjoining the flat sections 26 and 28. The full rim with the profile as shown in FIG. 22 is characterized by a particularly low bulk combined with adequate protection of the edge of the inserted lens.

[1][Translator's Note: Unconfirmed possible translation of term: compound bevel.]

The sixth exemplary embodiment, as shown in FIG. 23, differs from the fifth exemplary embodiment, as shown in FIG. 22, only in the profile of the full rim. This profile, as shown, is hat-shaped, so that the support surfaces 22 and 24 are widened compared to the fifth exemplary embodiment.

In the seventh exemplary embodiment, as shown in FIG. 24, the protrusion 56 surrounding the lens is configured as a so-called "sharp"[2] bevel, whose flanks extend to the front and back of the lens, such that the edge of the lens has no flat sections. The full rim has an essentially rectangular profile and on its inner side has the surrounding groove 58, whose profile is triangular to fit the protrusion 56.

[2][Translator's Note: Unconfirmed possible translation of term: pin bevel.]

In the exemplary embodiments shown in FIGS. 22 through 24, the inner contour line of the corresponding full rim runs along the bottom of the groove 58 formed in the full rim. As in the first through fourth exemplary embodiments of the central piece, the shape of this inner contour line conforms to the shape of the outer circumferential line of the lens when the lens is inserted.

In all the exemplary embodiments of the central piece described above, the form-locking and/or force-locking engagement between the full rims and the edges of the lens normally suffices to ensure adequate retention of the lenses in the central piece. Provision may however be made for the lenses to be fastened in the central piece by additional means, for example using an adhesive.

The invention is not limited to the exemplary embodiments described above. Rather, the invention according to claim 1 may also be implemented in other ways than are described above.

The central piece of a full-rim eyeglass frame according to the present invention includes a left full rim for receiving a left lens, a right full rim for receiving a right lens, a bridge joining the two full rims, and two endpieces. The two full rims, the bridge and the two endpieces are integrally formed as a single piece, from a plastic. The two full rims are flexible, and are constituted by a closed, elastic band. The central piece of the full-rim frame is assembled into a central piece of a pair of eyeglasses with two lenses, whose outer circumferential lines have somewhat larger dimensions than the inner contour lines of the two full rims, so that the full rims of the central piece of the eyeglasses are stretched around the lenses and their shape conforms to the shape of the lenses.

What is claimed is:

1. A central piece of a full-rim frame for eyeglasses comprising a left full rim for receiving a left lens and having an inner side, a right full rim for receiving a right lens and having an inner side, a bridge joining the two full rims, and two endpieces, one of which is arranged on a side of each full rim opposite the bridge, the two full rims, the bridge and the two endpieces being integrally formed as a single piece and being made of a plastic, wherein the two full rims are flexible and approximate a closed ring.

2. The central piece as recited in claim 1, wherein the two full rims further have, on their inner side, a surrounding protrusion to engage a surrounding groove in the edge of the corresponding lens.

3. The central piece as recited in claim 2, wherein the protrusion has an essentially semicircular profile.

4. The central piece as recited in claim 3, wherein the two full rims have an essentially circular profile.

5. The central piece as recited in claim 3, wherein the two full rims have an essentially rectangular profile.

6. The central piece as recited in claim 3, wherein the two full rims have a profile defined by two semicircles with different radii, and two straight lines joining the semicircles, the semicircle with the smaller radius being arranged on the inner side of the full rim.

7. The central piece as recited in claim 1, wherein the two full rims define, on their inner side, a groove to engage a surrounding protrusion formed on an edge of the corresponding lens.

8. The central piece as recited in claim 7, wherein the groove has a triangular profile.

9. The central piece as recited in claim 7, wherein the two full rims have an essentially circular profile.

10. The central piece as recited in claim 7, wherein the two full rims have an essentially rectangular profile.

11. The central piece as recited in claim 7, wherein the two full rims have an essentially flat-shaped profile.

12. The central piece as recited in claim 1, wherein the profile of each of the two full rims has the same cross sectional dimensions at substantially all portions thereof.

13. The central piece as recited in claim 1, wherein each of the two full rims, at least in the region of the bridge and/or in the region of the endpieces, has support surfaces to fit against flat sections in an edge of the corresponding lens.

14. The central piece as recited in claim 1, wherein a hinge leaf of an eyeglass hinge is molded onto each of the two endpieces.

15. The central piece as recited in claim 1, wherein each of the two endpieces is configured as a peg-like protrusion and a separately produced hinge leaf of an eyeglass hinge is fastened to each protrusion.

16. The central piece as recited in claim 1, wherein a separately produced pad arm component is attached to the bridge.

17. The central piece as recited in claim 1, wherein the plastic is a polyamide.

18. A central piece of a full-rim frame for eyeglasses comprising:
   a flexible left full rim for receiving a left lens and having an inner side;
   a flexible right full rim for receiving a right lens and having an inner side;
   a bridge joining the two full rims; and
   two endpieces, one of which is arranged on a side of each full rim opposite the bridge, wherein the two full rims, the bridge and the two endpieces are integrally formed as a single piece and made of a plastic, wherein the two full rims further have, on their inner side, a peripheral protrusion to engage a surrounding groove in the edge of the corresponding lens, and wherein each of the two full rims, at least in the region of the bridge and/or in the region of the endpieces, has support surfaces to fit against flat sections in an edge of the corresponding lens.

19. The central piece as recited in claim 18 wherein each of the two endpieces is configured as a peg-like protrusion and separately produced hinge leaf of an eyeglass hinge is fastened to each protrusion.

20. The central piece as recited in claim 18 wherein a hinge leaf of an eyeglass hinge is molded onto each of the two endpieces.

21. The central piece as recited in claim 18 wherein a separately produced pad arm component is attached to the bridge.

22. The central piece as recited in claim 18 wherein a protrusion has an essentially semicircular profile.

23. A central piece of a full-rim frame for eyeglasses comprising:
   a flexible left full rim for receiving a left lens and having an inner side;
   a flexible right full rim for receiving a right lens and having an inner side;
   a bridge joining the two full rims; and
   two endpieces, one of which is arranged on a side of each full rim opposite the bridge, wherein the two full rims, the bridge and the two endpieces are integrally formed as a single piece and made of a plastic, wherein the two full rims define, on their inner side, a groove to engage a surrounding protrusion formed on an edge of the corresponding lens, and each of the two full rims, at least in the region of the bridge and/or in the region of the endpieces, has support surfaces to fit against flat sections in an edge of the corresponding lens.

24. The central piece as recited in claim 23 wherein a hinge leaf of an eyeglass hinge is molded onto each of the two endpieces.

25. The central piece as recited in claim 23 wherein each of the two endpieces is configured as a peg-like protrusion and a separately produced hinge leaf of an eyeglass hinge is fasted to each protrusion.

26. The central piece as recited in claim 23 wherein a separately produced pad arm component is attached to the bridge.

27. The central piece as recited in claim 23 wherein the groove has a triangular profile.

* * * * *